United States Patent
Pinder

(10) Patent No.: US 7,149,554 B2
(45) Date of Patent: Dec. 12, 2006

(54) ACCESS CONTROL METHOD UTILIZING A KEY BATTERY

(75) Inventor: Ellis Arthur Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 17 days.

(21) Appl. No.: 10/409,797

(22) Filed: Apr. 9, 2003

(65) Prior Publication Data

US 2003/0190935 A1  Oct. 9, 2003

Related U.S. Application Data

(63) Continuation-in-part of application No. 09/398,303, filed on Sep. 20, 1999, now abandoned.

(51) Int. Cl.
*H04B 1/38* (2006.01)
*H04M 1/00* (2006.01)

(52) U.S. Cl. .................. 455/572; 455/343.1; 455/411; 455/418

(58) Field of Classification Search ............. 455/411, 455/343.3, 343.1, 572, 573, 574, 558, 410, 455/90.2, 418, 419, 343.2, 343.4, 343.5, 455/343, 420, 343.6, 90.1, 552.1
See application file for complete search history.

(56) References Cited

U.S. PATENT DOCUMENTS

| | | | |
|---|---|---|---|
| 5,501,829 A | 3/1996 | Nichols | 264/261 |
| 5,771,448 A * | 6/1998 | Cooper | 455/411 |
| 5,857,146 A * | 1/1999 | Kido | 455/343.1 |
| 5,904,002 A | 5/1999 | Emerling et al. | 49/502 |
| 6,128,511 A * | 10/2000 | Irie | 455/558 |
| 6,212,410 B1 * | 4/2001 | Ishida | 455/572 |
| 6,243,596 B1 * | 6/2001 | Kikinis | 455/572 |
| 6,522,902 B1 * | 2/2003 | Nishihara et al. | 455/574 |
| 6,546,674 B1 | 4/2003 | Emerling et al. | 49/502 |

* cited by examiner

*Primary Examiner*—Edward F. Urban
*Assistant Examiner*—John J Lee

(57) ABSTRACT

An access control system (100) for enabling functionality to a portable communications device includes a battery (120) for providing access to user-agnostic, system-agnostic and radio transceiver-agnostic control data to the portable communications device such as a portable two-way radio transceiver (110). A data connection (150) connected between the battery (120) and the portable two-way radio transceiver (110) provides control data to radio (110) and enables access to a predetermined set of device functions.

14 Claims, 3 Drawing Sheets

ACCESS CONTROL METHOD UTILIZING A KEY BATTERY

CROSS-REFERENCE TO RELATED APPLICATION

This application is a continuation-in-part of application Ser. No. 09/398,303, filed Sep. 20, 1999, entitled ACCESS CONTROL METHOD UTILIZING A KEY BATTERY, now abandoned.

TECHNICAL FIELD

This invention relates in general to a two-way portable communications device and more particularly to controlling access to local device functionality in a user-agnostic manner by means of a key battery.

BACKGROUND

Two-way portable communications devices such as two-way radios and the like have many applications for both business and pleasure. It is often desirable that certain features or capabilities of the device be restricted from general use. In one instance, certain features or capabilities may only be appropriate for users with special training. In other instances, certain features may be legally or administratively authorized only for a specific group of users. In such cases, the typical user has no access or use of the special features of the device.

It is undesirable to control access to special features of each device by configuring each differently. One such implementation would be to program some devices with "basic" firmware and program enhanced devices with "extended" firmware. This approach provides maximum security but no flexibility. Each device has a static configuration and may not be changeable in the field. If it is changeable, this would effectively be an upgrade and would likely require a personal computer (PC), software, and customized cables. As can be easily recognized, this process is both time-consuming and inconvenient. A reverse process may be required to restore a device to the "basic" level of functionality. One additional solution is to program configuration information in each device that selects whether the extended functions are available. In this approach, the extended level firmware is present in all devices, but is selectively blocked based on pre-programmed configuration data. This approach is less secure in that an unauthorized person can potentially change the configuration data. Activating or de-activating functionality is still time-consuming and inconvenient, because a PC, software and customized cables are all required to re-program the configuration data.

Still yet another improved approach is to deploy all devices with "extended" firmware and to limit access to special features (i.e., those beyond "basic" firmware feature set) using an access control mechanism that is part of the device. This might be in the form of a computer dongle to authorize use of PC software. Thus, the software providing operation of general features is present on all devices and is available to all users. The software providing operation of the restricted features is present on all devices and is potentially available to any authorized user. If the access control mechanism is simple, portable, and unobtrusive, any device can be quickly and conveniently changed between a basic device and an extended device, thus enabling or disabling special functions, features, or capabilities.

The need to enable or disable special functionality easily in the field is very important. An example of such need is a two-way radio with Front Panel Programming (FPP) capability. Such a radio is capable of being programmed directly using the radio's own keypad and display. Since a commercial two-way radio is capable of transmitting on a large number of frequencies, including those used by police and public safety agencies, it is desirable to restrict access to the front panel programmable feature to minimize the impact of a malicious user.

A common access control method employed to restrict access to radio functionality is a password. Correct entry of a password will enable access to one or more restricted features. Although the password technique is easy to implement and use, it does have a security disadvantage. If the password is learned by an unauthorized party, it can be used to gain unauthorized access until the radio is re-programmed with a new password. Due to practical considerations, it is typical for a group or "fleet" of radios to have the same access password, so a compromised password could be used against any radio. In such a case, the security disadvantage of the password access method is a serious concern. An alternate method involves the use of a hardware key that attaches to the radio. When the radio detects the presence of a valid hardware key, the radio will allow access to restricted features. This technique offers some improvement over a password-only scheme, since physical possession of the hardware key is required. In FPP radio applications, the Federal Communications Commission (FCC) has required radio manufacturers to utilize a hardware key mechanism to control access to the FPP feature. Combining a hardware key with a password scheme offers even more enhanced security.

The addition of a typical hardware key to a portable communication device such as a two-way radio has, however, a number of disadvantages. These include: 1) Altering the form factor of the device and/or increasing its size, making it less comfortable to use; 2) The hardware key must be designed and tooled, which is costly, and changes in industrial design or electrical interface in successive products may preclude the re-use of the hardware key; and 3) The key requires the addition of a connector on the radio, or the key occupies an existing connector that can no longer be used for other purposes while the key is present. Radio accessories, for example, may be unusable if the hardware key occupies this connector.

Thus, there is a great need for an access control mechanism to control access to restricted functionality of a portable communications device. It is preferable that the means to obtain access utilizes a hardware key that is inexpensive to design and manufacture, does not alter the form factor of the device, and does not prevent the use of accessories or other capabilities.

DETAILED DESCRIPTION OF THE PREFERRED EMBODIMENT

Figure 1:
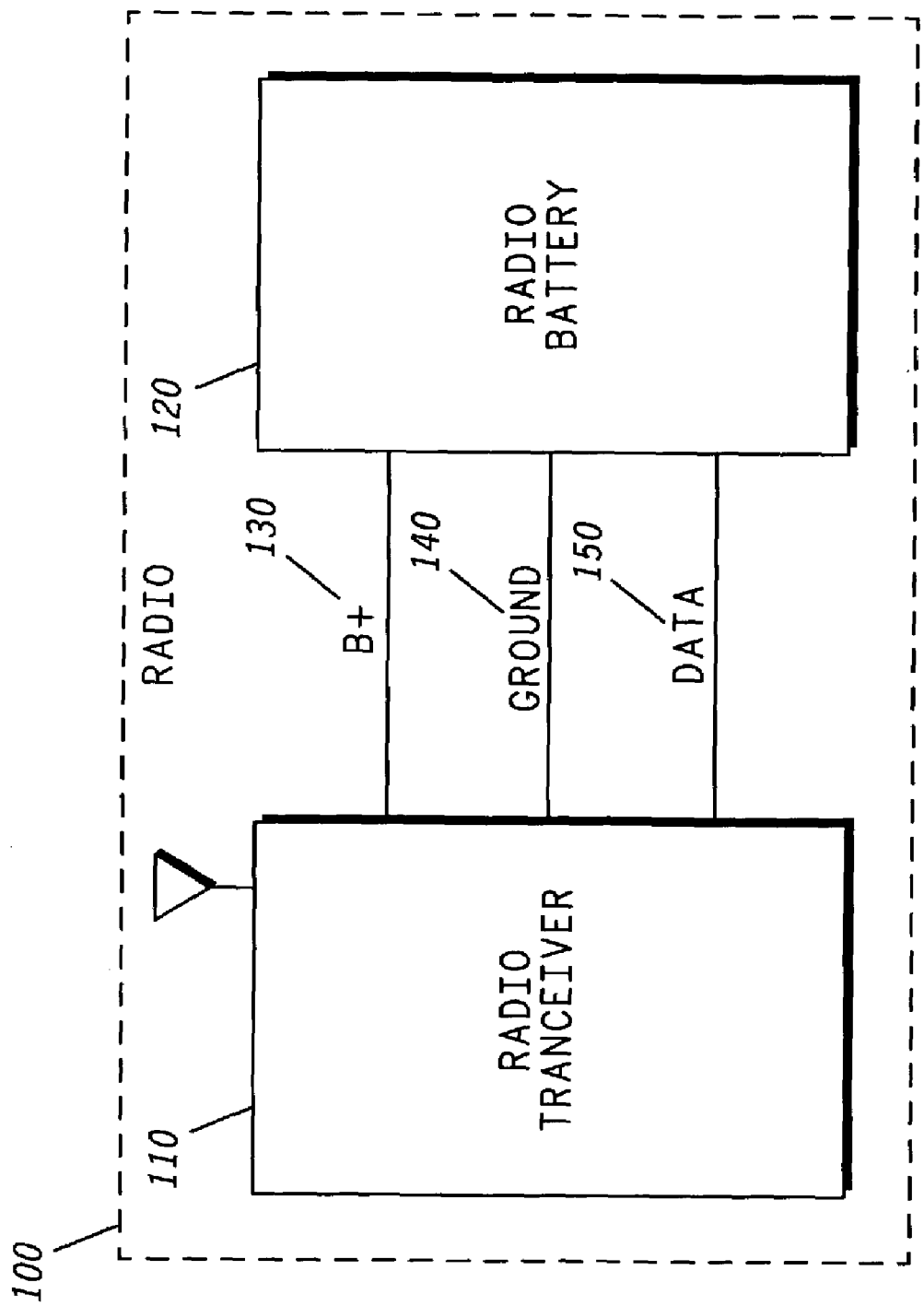
FIG. 1 is a block diagram illustrating a communication device consisting of a radio transceiver and a radio battery pack in accordance with the preferred embodiment of the present invention.

While the specification concludes with claims defining the features of the invention that are regarded as novel, it is believed that the invention will be better understood from a consideration of the following description in conjunction with the drawing figures, in which like reference numerals are carried forward.

Portable communications devices today often utilize battery packs that contain one or more primary or secondary cells, a memory device, and sensors, such as for battery temperature. The memory device is typically a non-volatile device, such as a PROM or serial EEPROM. To minimize the number of electrical connections to the battery, serial devices are commonly utilized. The memory devices typically contain parameters about the battery, such as chemistry type, charging rates, etc. This information, which is generally programmed when the battery is manufactured, is used by the battery charger to properly and safely charge the battery. This information can also contain thresholds to be used by the radio to provide a multi-segment battery gauge, or "battery life remaining" indicator.

Referring now to FIG. 1, a portable communication device, or radio, consists of radio transceiver 110 which is powered by radio battery 120 which is typically included in a housing that is physically attached to the radio. A number of connections may exist between transceiver 110 and battery 120, including ground connection 140 and battery voltage supply 130. In addition, data connection 150 provides read capability for the radio to access stored information in radio battery 120. Data connection 150 is sufficient for "one wire" serial memory devices, but those skilled in the art will recognize that some serial devices require multiple lines for clock, control signals, etc.

Figure 2:
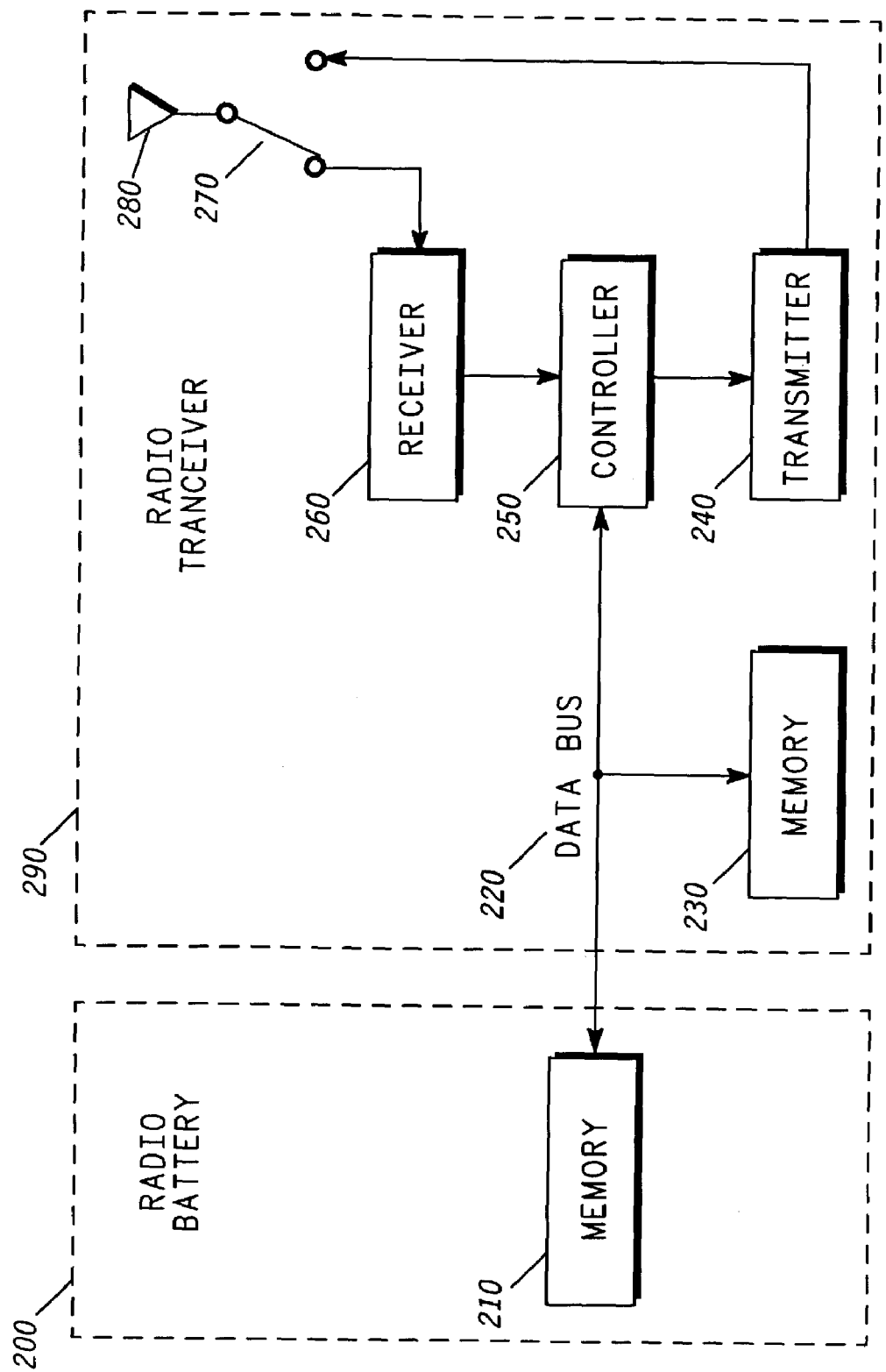
FIG. 2 is a block diagram of selected radio transceiver components and radio battery including a memory component in accordance with the preferred embodiment of the invention.

A block diagram of a typical portable radio is depicted in FIG. 2. FIG. 2 illustrates a transceiver 290 that consists of a receiver 260 and transmitter 240, both connected to antenna 280 via antenna switch 270. Receiver 260 and transmitter 240 are both connected to controller 250, a microprocessor or similar device responsible for operating transceiver 290. Controller 250 operates using memory 230, which is accessed using data bus 220.

Portable radio transceiver 290 is powered by radio battery 200, which contains memory device 210 that is also accessible by controller 250 on data bus 220. It should be recognized that controller 250 may use both a serial and a parallel instantiation of data bus 220 to accommodate the various choices for the memory devices 210, 230.

In the preferred embodiment, memory device 210 in radio battery 200 is read-only. In an alternate embodiment, memory device 210 is read/write capable, thus allowing the communication device or battery charger to update information in radio battery memory device 210. As previously explained, memory device 210 typically contains information about the operational characteristics about the battery, including charging information. Manufacturing information such as model number, serial number, and manufacturing date may also be present. In accordance with the present invention, battery memory device 210 also contains one or more sets of access control data or authorization "keys."

As will be recognized by those skilled in the art, each battery key corresponds to some specific, restricted functionality provided by software executed locally on the radio. The key is associated with any radio whose software recognizes that key, but the key is not associated with a particular radio unit. In the preferred embodiment, a particular radio model will have a single software build and a key will be valid for all radios. Multiple keys may be supported to activate different combinations of restricted functionality. In an alternative embodiment, a very large group of radios may be ordered by a large customer and this customer may be assigned its own key. Even in this embodiment, a key is not associated with a particular radio. The key is valid on all radios in the large group. Keys are also not associated with particular users. No information in the battery key contains any user information or user identification (ID). Any individual with physical possession of a key battery can activate extended functionality on any radio that determines a key in the battery to be valid. It is recognized that some radios may contain user IDs for radio-to-radio signaling, however these IDs are independent from the access control mechanism and the keys themselves.

For example, an entity such as a corporation or governmental agency with perhaps 500 radios may have as many as thirty (30) key batteries. The entity may wish to keep the key batteries installed on supervisor radios at all times, thereby giving the supervisor radios additional capability. Should a supervisor radio be damaged or require service, a key battery can be moved to any normal radio with the new radio immediately offering additional functionality. It is not necessary that the key battery be tied to any particular radio or any particular supervisor. Thus, the access control mechanism, namely, the key battery, can be said to be "user-agnostic" and "radio-agnostic."

To further illustrate this point, the entity might choose to never keep the key batteries in constant service on radios. The key batteries are still in the possession of the supervisors or are available to them. If the particular extended functionality guarded by the access control mechanism allows the user to change channel programming and other settings, then the supervisors can use the key batteries to change any radio in the field as needed. The supervisor attaches the key battery, gains access to the extended functionality, utilizes the extended functionality, and then removes the key battery. The radio no longer has enhanced functionality, but the radio's settings have been modified by the supervisor. Any key battery in the possession of any supervisor would have been able to perform this operation on any of the organization's radios. Thus, the access control mechanism is again shown to be "user-agnostic" and "radio-agnostic." This example is a typical case in the use and management of a fleet of Front Panel Programmable (FPP) radios.

Many communication devices today require the use of some operational infrastructure such as a cellular telephone network or a private, trunked two-way radio system. Some communication devices, such as conventional two-way radios, do not require such infrastructure and can operate independently. Other devices support multiple modes of communication, some of which may require infrastructure and some of which do not. Those skilled in the art will recognize that communication devices capable of communicating with sophisticated infrastructure may be designed to implement an access control mechanism "over the air." While this approach does have its advantages, there are also limitations. The coverage of the infrastructure cannot be assured, and the operational availability of the infrastructure cannot be assured. There are many applications for the present invention for which access to the restricted functionality must be assured regardless of radio location or coverage. For example, many users of FPP-capable radios such as forestry personnel and backcountry firefighters commonly operate in rural or remote areas where infrastructure is not available. Besides the limitations already provided, such capability is outside the scope and intent of the present invention. Those skilled in the art will recognize that the preferred embodiment requires no communication system infrastructure or user identification data of any kind. The presence of such infrastructure, however, does not preclude or limit the operation of the present invention. Those skilled in the art will also recognize that the access control mechanism in the present invention is local to the radio.

Thus, a battery with a particular key may power any radio for general operation and may enable access to restricted, locally-provided functionality on any radio that requires or accepts that particular key. The access control method of the present invention is therefore user-agnostic, communication system-agnostic, and radio transceiver-agnostic. With regard to FIG. 2, each software key stored in battery memory device 210 corresponds to a restricted local feature or capability of the communication device. Controller 250 is able to detect the presence of one or more software keys. Detected keys, which may optionally be encrypted are then validated. The presence of a given key permits access or use of a predetermined set of device functions, and the absence of the key denies access.

Figure 3:
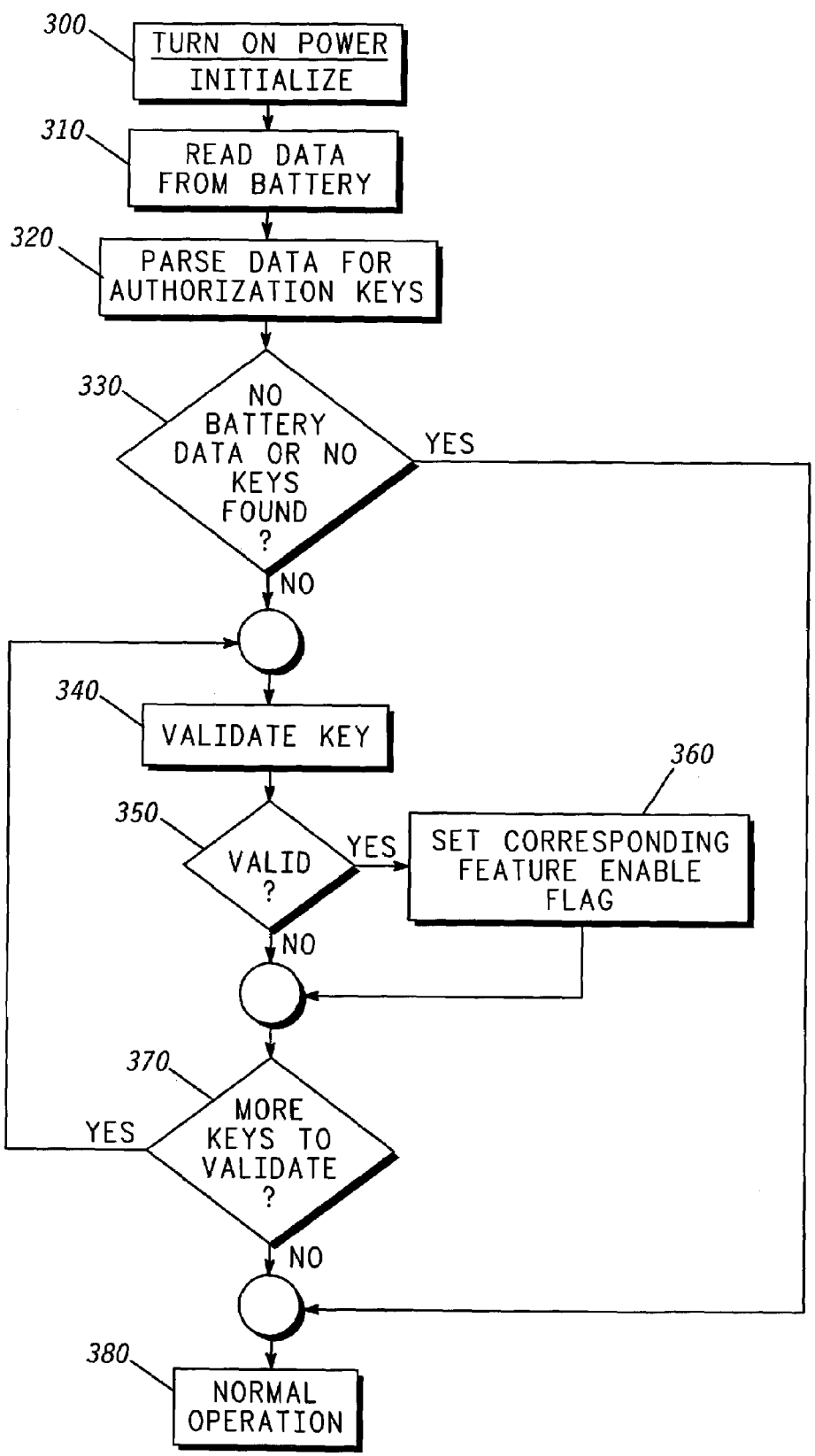
FIG. 3 is a flowchart diagram showing a method for enabling functionality to a set of locked device functions in a portable communications device in accordance with the preferred method of the present invention.

FIG. 3 is a flowchart diagram depicting the detection and processing of battery keys in accordance with the present invention. When the communication device is powered on 300, the device performs initialization and self-check tasks commonly associated with power-up of microprocessor-controlled devices. Upon completion of these tasks, the radio attempts to read data 310 from the attached battery. This battery data, if available, may contain one or more keys. Lack of battery data may indicate the use of a non-key battery, a third-party manufactured battery, or a malfunctioning battery. The radio then parses the data 320 received from the battery to determine if any keys are present. If no battery data is present, or if no battery keys are detected in the battery data 330, then normal operation 380 of the device begins without access being granted to any restricted features.

If battery data was read and at least one key was detected 330, then the radio will validate 340 the first detected key. Validation involves decoding and possible decryption. If the key is validated 350, then a feature enable flag is set corresponding to the validated key. A feature enable flag exists for every restricted feature or set of restricted features controlled by a key, and is used to enable the associated functionality in the radio. Upon setting of a feature validation flag 360, or if the first detected key was not valid 350, the radio determines if there are more keys to validate 370. If more keys are present, then the validation process 340, 350 is repeated for each additional key detected, and the feature enable flag corresponding to each validated key is enabled 360. Once all detected keys have been validated, normal operation 380 begins. Any restricted feature will now be accessible if the corresponded feature enable flag is set.

Thus, the present invention defines an access control system for enabling local functionality to a portable communications device. The invention includes a battery for providing user-agnostic, system-agnostic and radio transceiver agnostic access control data to a portable communications device over a data connection between the battery and the device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An access control system for enabling functionality to a portable communications device comprising:
    at least one battery pack for removably coupling to the portable communications device, the at least one battery pack for providing user-agnostic, system-agnostic and radio transceiver-agnostic access control key data to the portable communications device; and
    at least one data connection between the at least one battery pack and the portable communications device for providing user-agnostic access control key data independent of user ID) and user information, system-agnostic access control key data independent of communication system infrastructure, and radio trancciver-agnostic access control key data independent of any particular radio to the portable communications device and the access control key data enabling access to a predetermined set of local functionality of the portable communications device.

2. An access control system as in claim 1, wherein the portable communications device is a two-way radio.

3. An access control system as in claim 1, wherein the user-agnostic, system-agnostic and radio transceiver access control data is a software key.

4. An access control system as in claim 3, wherein the software key is encrypted.

5. An access control system as in claim 1, wherein the predetermined set of local functionality includes front panel programming (FPP) using an attached keypad.

6. An access control system for enabling access to a front panel programmable (FPP) feature of a portable communications device comprising:
    at least one battery pack for removably coupling to the portable communications device, the at least one battery pack for providing user-agnostic access control key data independent of user ID and user information, system-agnostic access control key data independent of communication system infrastructure, and radio transceiver-agnostic access control key data independent of any particular radio to the portable communications device; and
    at least one data connection between the at least one battery pack and the portable communications device for providing user-agnostic, system-agnostic and radio transceiver-agnostic access control key data to the portable communications device and enabling access to the FPP feature based on the access control key data.

7. An access control system as in claim 6, wherein the portable communications device is a two-way radio.

8. An access control system as in claim 6, wherein the user-agnostic, system-agnostic and radio transceiver access control data is a software key.

9. An access control system as in claim 8, wherein the software key is encrypted.

10. An access control system as in claim 6, wherein the FPP feature is accessed through an attached keypad.

11. A method for enabling functionality to a front panel programmable (FPP) feature in a portable two-way radio comprising the steps of:
    attaching a battery pack from a plurality of battery packs to the portable two-way radio;
    transferring user-agnostic access control key data independent of user ID and user information, system agnostic access control key data independent of communication system infrastructure, and radio transceiver-agnostic access control key data independent of any particular radio stored in the battery to the portable two-way radio using at least one data connection; and
    evaluating the access control key data at the portable two-way radio, and enabling the FPP feature if the user-agnostic, system-agnostic and radio transceiver-agnostic access control key data is authenticated.

12. An access control system as in claim 11, wherein the user-agnostic, system-agnostic and radio transceiver access control data is a software key.

13. An access control system as in claim 12, wherein the software key is encrypted.

14. An access control system as in claim 11, wherein the FPP feature is accessed using an attached keypad.

* * * * *